Jan. 14, 1958
S. HYMAN
2,819,646
SOUND ADAPTER MEANS FOR USE IN CONNECTION WITH MOTION PICTURE VIEWERS
Filed May 10, 1955
2 Sheets-Sheet 1
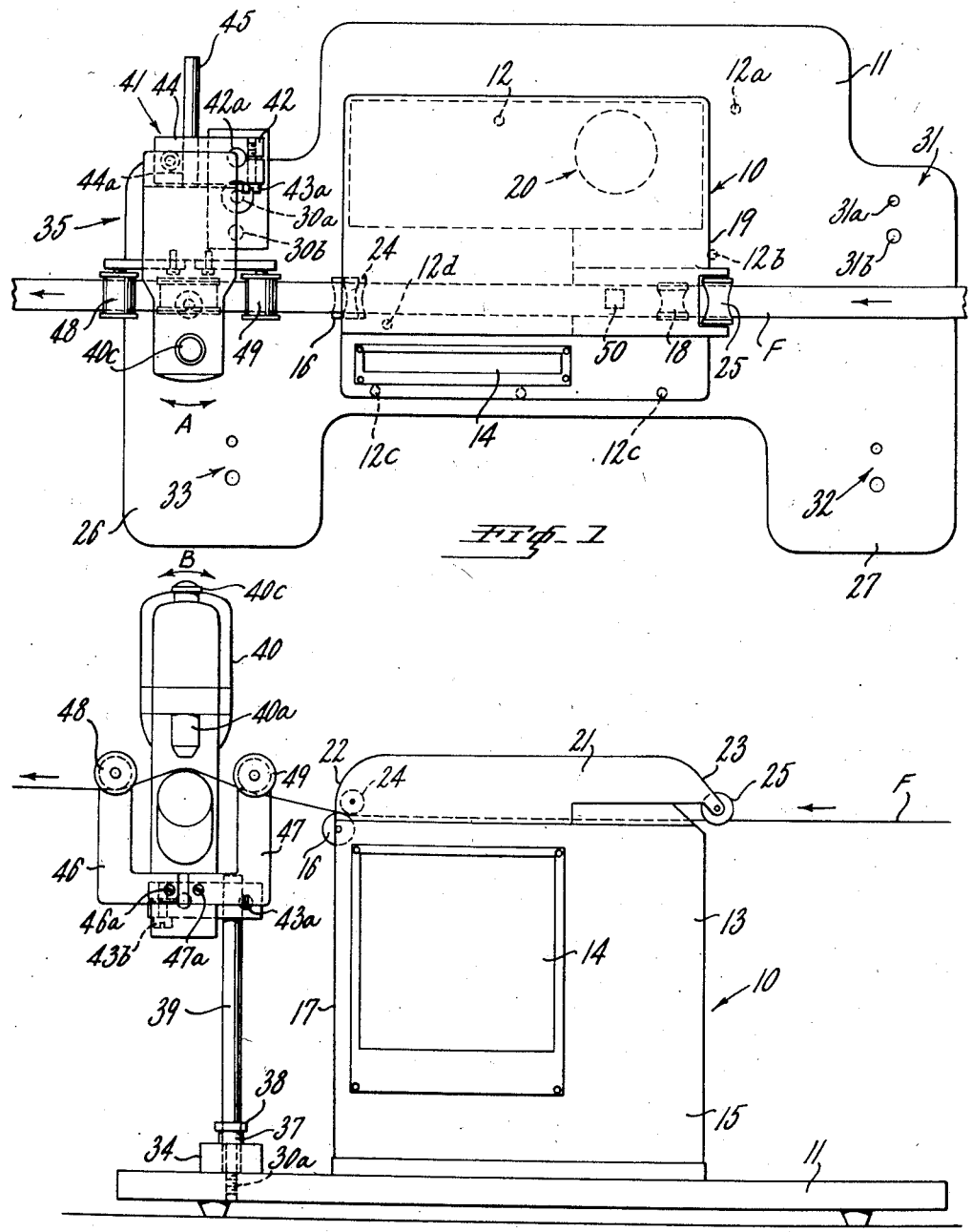
INVENTOR.
SAMUEL HYMAN
BY

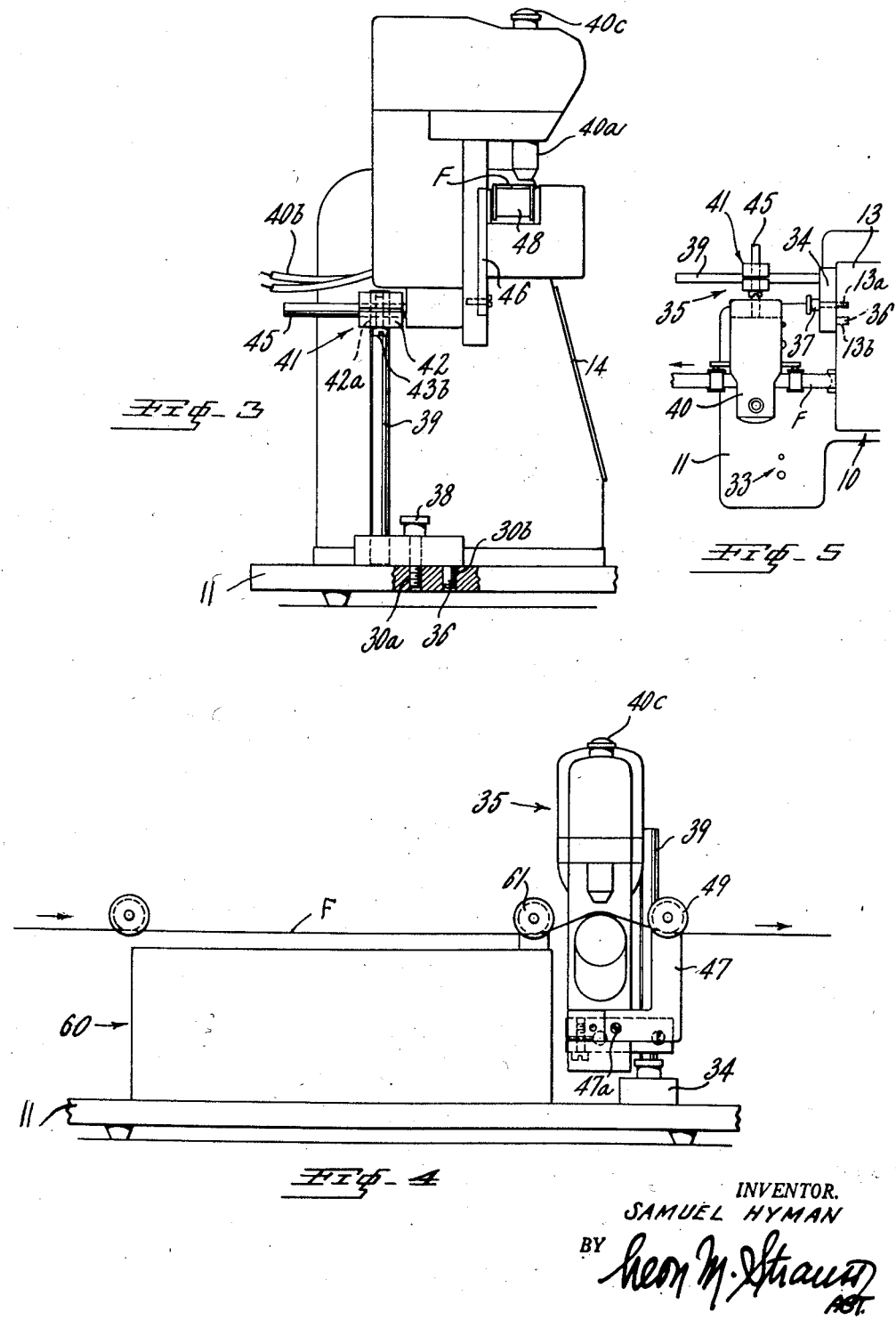

United States Patent Office 2,819,646
Patented Jan. 14, 1958

2,819,646

SOUND ADAPTER MEANS FOR USE IN CONNECTION WITH MOTION PICTURE VIEWERS

Samuel Hyman, New York, N. Y., assignor to The Camera Mart, Inc., New York, N. Y.

Application May 10, 1955, Serial No. 507,264

4 Claims. (Cl. 88—16.2)

This invention relates to adapter means for sound reproducing units for use in connection with motion picture viewers.

It is well known that for demonstration purposes, for laboratory use, as well as for editing purposes, film strips with or without sound track are run through a motion picture viewer equipped with sound pick-up and reproducing means forming an integral unit of such motion picture viewer.

It is also known to employ motion picture viewing units of various makes, some of which are constructed to feed motion picture film strip from the right hand side to the left hand side, while others provide the transmission of the film strips from the left hand side of the viewer apparatus.

It is further known to employ film strips separate from sound track strips and to synchronize the same, so that during editing certain adjustments can be made with respect to said strips carrying the sound track.

The present invention deals with an adapter device for sound reproducing units or systems and has one of its primary objects to provide means affording ready adjustment of said device to any motion picture viewer system now on the market.

It is another object of the present invention to provide means enabling regulation of height and distance of the sound reproducing unit from a base on which a single strip (sound and picture) reproducing system or double strip (sound separate from picture) reproducing system is carried and further the positioning of such unit for left-to-right and right-to-left film strip supply above such base.

A further object of the present invention is to provide means ensuring proper film strip alignment in regard to the sound head carried by the adapter device and accurate guidance of the film strip from the picture viewer to the sound reproducing unit.

Still another object of the present invention is to provide means effectuating adjustment of the sound reproducing unit to a position spaced a predetermined number of picture frames from the picture gate of the viewer so as to achieve full synchronization between picture reproduction and sound reproduction.

These and other objects of the invention will become further apparent from the following detailed description, reference being made to the accompanying drawings, showing preferred embodiments of the invention.

In the drawings:

Fig. 1 is a top plan view of an adapter structure having a base plate in accordance with one embodiment of the invention, a motion picture viewer of a predetermined make being shown mounted on said base plate adjacent a sound reproducing system supported by said adapter;

Fig. 2 is a front elevational view of the structure of Fig. 1;

Fig. 3 is a side elevational view of the structure of Fig. 1;

Fig. 4 shows more schematically a front elevation of the mounting of the adapter of Fig. 1, but used in connection with a motion picture viewer of a make different from that seen in Figs. 1 to 3, inclusive; and Fig. 5 is a top plan view of a modified arrangement of the adapter structure of Fig. 1.

Referring now more particularly to Figs. 1 to 3, a motion picture viewer 10 is fixed on a base plate 11 in the center portion thereof by means of screws or bolts (not shown) fitting into corresponding groups of apertures provided in the base plate 11. A plurality of such apertures 12, 12a, 12b, 12c, and 12d are disposed throughout the center portion of the base plate. In the modification of Fig. 1, for example, apertures 12a and 12b are not in use, being present only to permit mounting and attachment of a selected one of different types or models of viewers on the same base plate.

The viewer 10, which is only schematically illustrated in the drawings, consists of a housing 13 having a viewing screen 14 disposed in its front wall 15, a film guide roller 16 rotatably disposed in one of its side walls 17, a sprocket wheel 18 adjacent the opposite side wall 19, and an optical system 20 including a lamp, mirrors, lenses and a picture gate arranged in a conventional manner.

The top of the viewer is constituted by a hinged lid or cover plate 21 on which some parts of said optical system may be supported and which carries at opposite end walls 22, 23 a pair of guide rollers 24, 25, respectively, corresponding to and cooperating with the aforementioned guide roller 16 and sprocket wheel 18 on the housing 13 of the viewer 10.

Adjacent its side portions 26, 27 the base plate 11 is provided with four sets of holes 30, 31, 32, 33, each set consisting of one threaded hole and one unthreaded hole. Each set of holes, e. g., threaded hole 31a and unthreaded hole 31b of set 31, provides a mounting seat or location for a sound pick-up adapter 35 to be more fully described hereinbelow. As will become more evident hereafter, the adaptor 35 may, therefore, be placed at any one of said four seats or locations, so that such adapter may readily cooperate with any one of different makes of film viewers usable in different operating systems, e. g., single or double strip systems.

The adapter 35 consists generally of a base or support portion 34 from the lower surface of which there projects a dowel pin 36 adapted to fit into a corresponding unthreaded hole, e. g., 30b, of each of the aforementioned sets of holes. Also provided in said base portion is a bore through which extends a suitable fastener, e. g., a screw or threaded bolt 37 having a knurled head 38 at its upper end and adapted to be threaded into a corresponding threaded hole, e. g., 30a, of any of said sets of holes of said base plate 11.

Fixed to and projecting upwardly from the base portion 34 is a vertical standard or rod 39 on which the sound head 40 is to be mounted. For this purpose there is provided a dual clamp structure 41 having a first clamping portion 42 provided with a vertical recess 42a through which the standard 39 may project, a screw 43a being provided and enabling said first clamping portion 42 to be loosened or released for movement of the clamp structure as a unit along said standard 39. The clamp structure 41 also presents a second clamping portion 44 provided with a horizontal recess 44a spaced from the vertical recess 42a for a purpose to be more fully described below.

The sound head 40, which in a well known manner includes a pick-up structure 40a, power leads 40b, and a red light 40c to indicate whether the sound pick-up is energized or not, is provided adjacent its bottom end with a horizontally extending rod 45 adapted to engage in the horizontal recess 44a of the clamp structure 41 to be clamped thereby, a screw 43b being provided to permit loosening and tightening of clamping portion 44.

Thus, the sound head 40 as a unit may be adjusted vertically as well as horizontally through selective loosening and tightening of the aforesaid clamping portions 42 and 44. Moreover, these clamping portions are so designed that even though the sound head 40 is fixed in position as regards its vertical and horizontal location, it may nevertheless be rotated both in a horizontal plane (see arrow A, Fig. 1) and in a vertical plane (see arrow B, Fig. 2) about axes defined by the standard 39 and the horizontal rod 45, respectively.

Fixedly but removably attached to the sound head 40 are two substantially right-angled arms 46, 47, at the upper ends of which guide rollers 48, 49 are mounted for free rotation. These guide rollers 48, 49, which establish and predetermine the path of travel and prevent lateral displacement of a film strip F being edited may, therefore, be aligned with the guide rollers 16, 24 on the film viewer 10 by horizontal adjustment of the sound head 40 relative to the clamp structure 41.

In operation, it is preferable from a technical standpoint to locate the sound head 40 approximately 24 to 26 frames from the picture gate 50 provided in the viewer 10. Once the standard 39 is fixed to the base plate 11 and the guide rollers 48, 49 on the sound head 40 are brought into alignment with the guide rollers 16, 24 on the housing and with the picture gate 50 of the viewer through the necessary rectilinear and rotary adjustments of the sound head 40 relative to the standard 39, the position of the sound pick-up may be finally determined by rotating (see arrow B) the sound head 40 relative to the clamp structure 41 about the horizontal axis defined by the horizontally extending rod 45. This last-mentioned rotation substantially ensures that the proper number of frames will be located between the picture gate 50 and the sound head 40 and also enables the tension in the film to be adjusted.

The adapter 35 as a unit may be positioned in any one of the four locations defined by the four sets of holes 30 to 33 in the base plate 11 so as to allow use of the adapter with viewers employing left-to-right film feed instead of the right-to-left feed illustrated in Figs. 1 to 3, as well as in either a single or a double strip system, i. e., where the sound track and the picture frames are on the same film strip (as in Figs. 1 to 3) or where the sound track strip is separate from the film strip on which the picture frames appear.

Referring now to Fig. 4, the adapter 35 is there shown as employed with a film viewer of a different make. The viewer 60 is so wide that sound head 40 of the adapter 35 cannot be lowered along standard 39 for location in an operative position relative to the viewer 60 until one of the arms 46 or 47 supporting one of the guide rollers 48 or 49 for the sound head 40 is removed. In general, this will not be disadvantageous since the viewer 60 shown in Fig. 4 has a guide roller 61 beneath which the film strip passes in such a manner that this guide roller 61 assumes the function of the removed guide roller, say 48, of the sound head 40. The arm 46, for example, is removed by unscrewing screw 46a, while arm 47 is retained on the adapter 35 by means of screw 47a.

As may be seen from Fig. 5, the adapter 35 according to the present invention may also be mounted directly on the housing 13 of the viewer 10. This is accomplished by providing at least one threaded hole 13a and at least one unthreaded hole 13b in each side wall of housing 13 into which holes the screw 37 and the dowel pin 36 fit, respectively.

When the base portion 34 is thus affixed to the housing 13, both standard 39 and rod 45 are disposed horizontally relative to the viewer. Consequently, in order to bring the sound head 40 into an upright position in which the path of travel of the film strip F is located in a horizontal plane, it is merely necessary to rotate the sound head 40 relative to the clamping structure 41 through an angle of 90° about the axis defined by the rod 45. In such a construction, of course, the base plate 11 does not constitute a part of the adapter system and may be retained or dispensed with, as desired.

It will, of course, be realized that in any of the above-described embodiments of the invention, suitable film feeding and take-up means (not shown), such as a reel provided with manual or automatic driving means, is positioned near the viewer 10 on the same side thereof as the sound pick-up or reproducing unit 40, while the supply spool (not shown) of the film F being viewed or edited is located adjacent that side of the viewer 10 remote from the sound pick-up unit 40.

Thus it may be seen that according to the broadest aspect of the present invention there has been provided an adapter system for a sound reproducing unit to be used with a predetermined motion picture film strip viewer, comprising support means for carrying said sound reproducing unit, means for fixing the location of said support means with respect to said viewer, and adjustment means for operatively interconnecting said support means and said sound reproducing unit for regulating the position of the latter relative to said viewer, to thereby align the path of said film strip through the viewer with the path of said film strip through said unit.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. An adapter system for a sound reproducing unit to be used with a predetermined motion picture film strip viewer; comprising support means including a base portion and a standard extending substantially perpendicularly from said base portion for carrying said sound reproducing unit, means including at least one dowel pin projecting from said base portion for fixing the location of said support means with respect to said viewer, and adjustment means for operatively interconnecting said support means and said sound reproducing unit for regulating the position of the latter relative to said viewer, to thereby align the path of said film strip through the viewer with the path of said film strip through said unit, said adjustment means comprising a compound clamp structure having a first clamping portion and a second clamping portion, means operatively connected to said first clamping portion for adjustably fixing said clamp structure to said standard and at a predetermined distance from said base portion so as to prevent movement of said clamp structure longitudinally of said standard while permitting rotary movement of said clamp structure about said standard, and means operatively connected to said second clamping portion for adjustably fixing said sound reproducing unit to said clamp structure so as to prevent rectilinear movement of said unit along an axis oriented transversely to said standard while permitting rotary movement of said unit about said axis.

2. An adapter system according to claim 1, further comprising guide means for preventing lateral displacement of said film strip during movement thereof through said unit and including a pair of guide rollers and a pair of right-angled arms for supporting said guide rollers, respectively, and located adjacent opposite sides of said sound reproducing unit, said arms being provided with means for removably connecting the same to said adjustment means for pivotal movement about spaced parallel axes oriented substantially transversely to said standard.

3. An adapter system according to claim 1, said base portion being further provided with fastener means for fixedly connecting said support means to said viewer, said viewer being provided with a plurality of holes for receiving said fastener means and said dowel pin, respectively, whereby said support means and said sound reproducing unit carried thereby may be mounted directly on said viewer.

4. In an adapter system for a sound reproducing unit to be used in connection with a predetermined motion picture film strip viewer; a base plate provided with means for locating said viewer centrally of said base plate, support means for carrying said sound reproducing unit and including a base portion provided with at least one dowel pin and at least one screw projecting therefrom, said base plate being provided with a plurality of unthreaded holes and with a plurality of threaded holes disposed at spaced locations along the periphery of said base plate for receiving said dowel pin and said screw, respectively, to operatively position said support means on said base plate with respect to said viewer, a standard extending substantially perpendicularly from said base portion, and a clamp structure mounted on said standard for rotation thereabout and for adjustment therealong toward and away from said base portion, respectively, and provided with means for holding said sound reproducing unit for rectilinear movement relative to said viewer along an axis extending perpendicularly to said standard as well as for rotation about said axis, whereby said unit may be adjusted relative to said viewer for aligning the path of said film strip through the viewer with the path of said film strip through said unit.

References Cited in the file of this patent

UNITED STATES PATENTS

| | | |
|---|---|---|
| 1,876,668 | Hadley | Sept. 13, 1932 |
| 2,064,049 | Wurmet et al. | Dec. 15, 1936 |
| 2,105,741 | Kuhlik | Jan. 18, 1938 |
| 2,532,761 | De Blasio | Dec. 5, 1950 |
| 2,694,107 | Camras | Nov. 9, 1954 |